(12) United States Patent
Dayanidhi et al.

(10) Patent No.: US 8,520,808 B2
(45) Date of Patent: Aug. 27, 2013

(54) SYSTEM AND METHOD FOR ROBUST EVALUATION OF THE USER EXPERIENCE IN AUTOMATED SPOKEN DIALOG SYSTEMS

(75) Inventors: Krishna Dayanidhi, Jersey City, NJ (US); Keelan Evanini, Philadelphia, PA (US); Phillip Hunter, Arlington, TX (US); Jackson Liscombe, Brooklyn, NY (US); Roberto Pieraccini, New York, NY (US); David Suendermann, New York, NY (US); Zor Gorelov, North Caldwell, NJ (US)

(73) Assignee: Synchronoss Technologies, Bridgewater, NJ (US)

(*) Notice: Subject to any disclaimer, the term of this patent is extended or adjusted under 35 U.S.C. 154(b) by 993 days.

(21) Appl. No.: 12/575,801

(22) Filed: Oct. 8, 2009

(65) Prior Publication Data
US 2010/0091954 A1 Apr. 15, 2010

Related U.S. Application Data

(60) Provisional application No. 61/103,783, filed on Oct. 8, 2008.

(51) Int. Cl.
*G10L 15/01* (2013.01)
(52) U.S. Cl.
USPC .................................... 379/88.04; 704/270.1

(58) Field of Classification Search
USPC .................................... 379/88.04; 704/270.1
See application file for complete search history.

(56) References Cited

U.S. PATENT DOCUMENTS 7,962,339 B2 * 6/2011 Pieraccini et al. ............ 704/251
8,180,639 B2 * 5/2012 Pieraccini et al. ............ 704/251

OTHER PUBLICATIONS

"MALLET: A Machine Learning for Language Toolkit." http://mallet.cs.umass.edu. 2002).

* cited by examiner

*Primary Examiner* — Susan McFadden
(74) *Attorney, Agent, or Firm* — Frommer Lawrence & Haug LLP; William S. Frommer

(57) ABSTRACT

A single, subjective numerical rating to evaluate the performance of a telephone-based spoken dialog system. This CE rating is provided by expert human listeners who have knowledge of the design of the dialog system. Different human raters can be trained to achieve a satisfactory level of agreement. Furthermore, a classifier trained on ratings by human experts can reproduce the human ratings with the same degree of consistency. More calls can be given a CE rating than would be possible with limited human resources. More information can be provided about individual calls, e.g., to help decide between two disparate ratings by different human experts.

21 Claims, 5 Drawing Sheets

Fig. 1. Comparison of agreement among human raters

Fig. 2. Comparison of agreement between human and automatic raters

SYSTEM AND METHOD FOR ROBUST EVALUATION OF THE USER EXPERIENCE IN AUTOMATED SPOKEN DIALOG SYSTEMS

CROSS REFERENCE TO RELATED APPLICATIONS

This application claims priority to U.S. Provisional Patent Application Ser. No. 61/103,783 filed Oct. 8, 2008, the entirety of which is incorporated by reference herein.

FIELD OF THE INVENTION

The present disclosure relates to systems and methods automated spoken dialog interaction systems using speech recognition, such as Interactive Voice Response.

DISCUSSION OF RELATED ART

Automatic spoken dialog systems are often very complex. They may consist of hundreds of dialog states involving extensive dialog structures, have system integration functionality that communicates with backend databases or devices, support multiple input and output modalities, and can sometimes handle calls over more than 20 minutes in duration. In order to keep a caller engaged in such environments, the use of human-like speech processing is critical, e.g., the incorporation of various degrees of spoken language understanding, mixed-initiative handling, and dynamic response generation. One type of spoken language understanding, called natural language understanding, was first introduced on a large scale to automated spoken dialog systems as call classifiers. Here, the caller was asked a general question at the top of the call, such as, "Briefly tell me what you're calling about today." The caller's utterance was transcribed using a speech recognizer, and the caller was routed to a human agent based on a classification of the utterance produced by a semantic classifier. The human agent then interacted with the caller by providing services including, e.g., technical problem solving, billing support, or order processing.

Spoken dialog systems are often designed to emulate a human agent's role in the complexity of the services offered as well as in the length of interaction. At the same time, as dialog systems improve, so too do the expectations of callers. Several characteristics of modern dialog system design encourage callers to behave as if they were interacting with a human agent. Such characteristics include open-ended questions during the conversation and global commands such as "help" and "repeat" at every point in the dialog. This design encourages callers to say things that are not explicitly prompted by the context prompts in the dialog system. Furthermore, directed dialog prompts in which callers are asked to choose an item from a list often unintentionally elicit out-of scope utterances from callers by offering choices that may be incomplete, too vague, or too specific.

Today's automated spoken dialog interaction systems using speech recognition technology, such as IVRs (Interactive Voice Response systems) account for the so called user experience. Understanding and evaluating the Caller Experience (CE) provided by commercially-deployed automatic spoken dialog measures whether such a system is achieving its performance goals. A call's CE rating can indicate which interactions need to be streamlined, simplified, or made more robust. In addition, CE should be separated from the caller's emotional state, which may be influenced by many things that are outside the bounds of the interaction between the caller and the system. Such factors may include, for example, external characteristics of the caller's environment or the disposition of the caller at the moment of the call. CE is the treatment of the caller by the system. In other words, compared to an optimal hypothetical human-to-human interaction about the same subject with the same information available, did the automated system treat the caller as well as possible?

SUMMARY OF THE INVENTION

Disclosed is a system and method to estimate a user experience score. The embodiments comprise selecting a number of evaluators to score a statistically significant number of interactions in an interactive spoken dialog system; having each evaluator individually score the interaction recordings to evaluate the user experience of the interactive spoken dialog system. A value is obtained that reduces the variability in the individual scoring.

Also disclosed is a system and method to increase the robustness of the overall estimates of user experience based on the score of individual interaction recordings. The embodiments comprise selecting a set of recorded interactions for an automated spoken dialog interaction system, whereby the set statistically represents a corpus of interactions handled by the automated spoken dialog interaction system, selecting a number of evaluators to analyze the set; and having each evaluator score the recordings. The embodiments include accepting a score of the interactions that do not show any scoring difference across different evaluators, assigning an average score to the interactions that have an absolute predetermined score difference among the evaluators; and performing an adjudication process for all the interactions that have a score difference among the evaluators that is larger than the predetermined score difference to obtain an reevaluated score. The assigned average score and the reevaluated score are averaged to obtain an estimated value of the user experience. The assigned average score can be computed as the arithmetic average among all scores assigned by each evaluator. The predetermined score difference can be 1 point.

The adjudication process can further comprise having the evaluators reevaluate each interaction; having evaluators resubmit a reevaluated score; and repeating the reevaluation and resubmission until the difference in scores for each interaction is no greater than the predetermined score difference. The evaluators can reevaluate each interaction after communication amongst the evaluators about the evaluators' initial scoring. The number of evaluators can be at least 2.

Also disclosed is a system and method to automatically estimate the quality of the user experience comprising: creating a pool of sample training interactions; and defining a number of features of each interaction in the pool of sample training interactions, wherein the features can be derived and measured from each individual recording or from information associated with each interaction. The set of features of each training interaction are associated with a value of a user experience score produced by a plurality of evaluators; and the features and the scores of each interaction are used to train a machine learning algorithm, wherein the algorithm is trained to predict the score given to the features. The trained machine-learning algorithm is used to automatically estimate the user experience score for any set of interactions with the same or a different system, for which a set of features is produced. The automated estimation can be used conjunction with human evaluator estimates to score a set of interaction recordings and obtain an overall user experience score. Also disclosed is an interactive spoken dialog system, comprising a computer including a processor, and memory, including a data store for storing recordings of interactions on the spoken dialog system and an automated rater including a machine-learning algorithm configured to automatically estimate a user experience score for any set of interactions on the spoken dialog system. The system further includes a data store for feature data defining a number of features. The automated rater automatically estimates the user experience score for any set of interactions on the interactive spoken dialog system for the same features.

The system can also be configured to use the rater's automated estimate in conjunction with a human evaluator estimates to score the set of interaction recordings to obtain an overall user experience score. The system can be configured to obtain human evaluator estimates in the manner comprising: selecting a set of the recorded interactions for the spoken dialog system; selecting a number of the evaluators to analyze the set; having each evaluator score the recordings; accepting a score of the interactions that do not show any scoring difference across different evaluators; assigning an average score to the interactions that have an absolute predetermined score difference among the evaluators; performing an adjudication process for all the interactions that have a score difference among the evaluators that is larger than the predetermined score difference to obtain an reevaluated score; and averaging the assigned average score and the reevaluated score to obtain an estimated value of the user experience. The system can be configured to obtain human evaluator estimates in the manner further comprising: having the evaluators reevaluate each interaction; having evaluators resubmit a reevaluated score; and repeating the reevaluation and resubmission until the difference in scores for each interaction is no greater than the predetermined score difference.

The machine learning algorithm includes a classifier. The classifier can include a classifier selected from a decision tree, a propositional rule learner; and linear regression. The system can comprises a data store for storing logging data, wherein the logging data includes a speech log of a spoken dialog system, whereby the feature data is extracted from the logging data. The features can include a set of features selected from the group of: the classification status of a call; the number of speech recognition errors during a call; the number of operator requests from a caller; and the exit status of the call.

Also disclosed is a method to estimate a user experience score for an interactive spoken dialog system, comprising: selecting a number of evaluators to score a number of interactions in an interactive spoken dialog system; having each evaluator individually score the interaction recordings to evaluate the user experience of the interactive spoken dialog system; and obtaining a value that reduces the variability in the individual scoring.

Also disclosed is a method to evaluate user experience in a spoken dialog system comprising: selecting a set of recorded interactions for an interactive spoken dialog system, whereby the set represents a corpus of interactions handled by the spoken dialog interaction system; selecting a number of evaluators to analyze the set; having each evaluator score the recordings; accepting a score of the interactions that do not show any scoring difference across different evaluators; assigning an average score to the interactions that have an absolute predetermined score difference among the evaluators; performing an adjudication process for all the interactions that have a score difference among the evaluators that is larger than the predetermined score difference to obtain an reevaluated score; and averaging the assigned average score and the reevaluated score to obtain an estimated value of the user experience. The adjudication process comprises: having the evaluators reevaluate each interaction; having evaluators resubmit a reevaluated score; and repeating the reevaluation and resubmission until the difference in scores for each interaction is no greater than the predetermined score difference. The evaluators can reevaluate each interaction after communication amongst the evaluators about the evaluators' initial scoring.

The predetermined score difference can be 1 point. Assigning the average score can be computed as the arithmetic average among all scores assigned by each evaluators. The number is evaluators can be at least 2.

Also disclosed is a method to automatically estimate the quality of the user experience for a spoken dialog system comprising: creating a pool of sample training interactions for the spoken dialog system; defining a number of features for each interaction in the pool of sample training interactions, wherein the features can be derived and measured from information associated with each interaction; associating the features of each training interaction with a value of a user experience score produced by a plurality of evaluators; training a machine learning algorithm using features and the scores of each interaction, wherein the algorithm is trained to predict the score for the features; and using the trained machine-learning algorithm to automatically estimate the user experience score for any set of interactions on an interactive voice response system.

The method can comprise obtaining human evaluator estimates; and using the automated estimate in conjunction with the human evaluator estimates to score a set of interaction recordings to obtain an overall user experience score. The method include using the rater's automated estimate in conjunction with a human evaluator estimates to score the set of interaction recordings to obtain an overall user experience score. The method can include obtaining human evaluator estimates in the manner comprising: selecting a set of the recorded interactions for the spoken dialog system; selecting a number of the evaluators to analyze the set; having each evaluator score the recordings; accepting a score of the interactions that do not show any scoring difference across different evaluators; assigning an average score to the interactions that have an absolute predetermined score difference among the evaluators; performing an adjudication process for all the interactions that have a score difference among the evaluators that is larger than the predetermined score difference to obtain an reevaluated score; and averaging the assigned average score and the reevaluated score to obtain an estimated value of the user experience. The method can further include: having the evaluators reevaluate each interaction; having evaluators resubmit a reevaluated score; and repeating the reevaluation and resubmission until the difference in scores for each interaction is no greater than the predetermined score difference.

The machine learning algorithm can be a classifier. The classifier can be selected from: a decision tree; a propositional rule learner; and linear regression. The features include measures extracted from a speech log of a spoken dialog system. The features can include a set of features selected from: the classification status of a call, the number of speech recognition errors during a call, the number of operator requests from a caller, and the exit status of the call. The method can include automatically estimating the user experience score for any set of interactions on a different spoken dialog system, or automatically estimating the user experience score for any set of interactions on the same spoken dialog system.

DETAILED DESCRIPTION OF THE INVENTION

Figure 1:
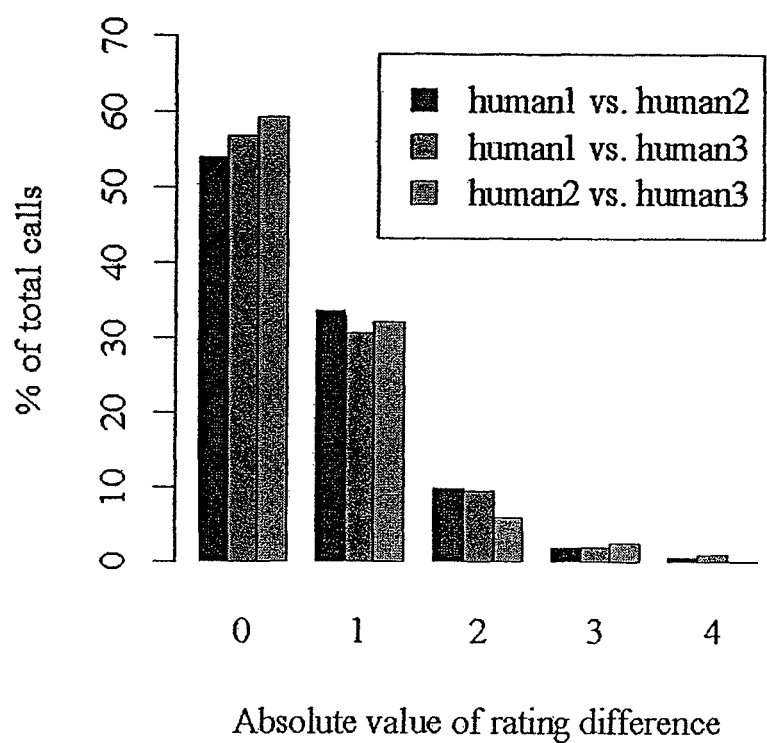
FIG. 1 is a histogram showing the distribution of absolute differences of scores of IVR analysis for three groups of analysts.

It is noted that in this disclosure and in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

A user experience is evaluated by contacting and surveying users some time after they conducted an interaction with a spoken dialog system. Users are generally interviewed a short time after they have interacted with systems (e.g., within 24 hours), and asked to answer a number of predefined questions, such as "Was it easy to interact with the system?" or "Would you use the system again?" Rather than survey the caller, which can be an expensive and imprecise process, CE can be measured by having expert listeners evaluate a large number of randomly selected recordings of human-computer interactions. The expert listener understands the basic design of the system and is able to judge how the system is treating the caller. Elements of this treatment include questions such as:

Does the system hear the caller when they say in-scope utterances?

Does the system accurately recognize what the caller says?

Are system responses as appropriate and helpful as possible?

Does the system accurately identify and satisfy the reason for the call?

Having expert listening for several hundred appropriately selected calls can result in an accurate and helpful CE rating. The rating, on a scale of 1 to 5, for example, can be used to make judgments about the usability and efficacy of the system. Evaluations can be conducted on a set of recorded full interactions that include the system's prompts as well as the user's input speech. A team of experienced analysts listen to a significant number of these interaction recordings and provide a "user experience" or CE score for each one of them based on a predefined number of different dimensions (e.g. quality of the system responses, latency, level of speech recognition errors, number of successive requests of the same piece of information, etc.). The average score can be used as an estimate of the user experience provided by the system. This approach can provide a quite high level of insight into the system since the analysts can also give a score to each one of a number of predefined features that may affect the user experience, and the individual scores can be used to understand what the main factors that affect the performance of the system are. However, the scoring of each interaction being mainly subjective, different analysts can provide a quite variable range of scores for the very same interactions. Also, while expert listening is a reliable way to ascertain a CE, the rating requires trained experts and a large investment of time spent listening to calls.

Evaluation and scoring of the user experience for each individual sample recording of the interaction between users and a spoken dialog system is subjective, and thus depends on the opinion of each individual listener. As such, it is subject to statistical variability. Assume, for example, that listeners of a certain number of interactions that represents a statistically significant sample of an IVR application in question are asked to provide, for each recording, a score between 1 and 5, corresponding to the following subjective scale:

User experience is:
1. Bad
2. Poor
3. Fair
4. Good
5. Excellent

Although general guidelines can be provided that would help consolidate the scores, a certain variance of the result across different listeners is expected. As an example, the variance across listeners can be shown by the results of the following experiment. Three groups of analysts (human1, human2, and human3) listened to the same few hundred interaction recordings. The absolute difference between the scores for each of the samples for each combination of participating listeners was computed. These absolute differences are distributed according to the following histogram in FIG. 1.

Using data from 1500 calls annotated by 15 expert listeners, an algorithm can be implemented to automatically provide the subjective CE rating from objective measures. The chart in FIG. 1 shows that more than 50% of the interaction recordings had a score difference of 0, more than 30% had a score difference of 1, and less than 20% of the interactions had a score difference of 2 or more. So, less than 50% of the interactions show a different score. This variability would affect the robustness of the estimation of the average user experience. One way to increase the robustness of the average estimate is to increase the number of listeners for each one of the individual interaction recordings. This method is typically used in other subjective evaluations, like the Mean Opinion Score, which is applied to the estimation of the voice quality for communication or speech synthesis systems. Performing an average among a large number of subjective evaluations of the same stimulus increases the stability of each individual recording's average score and thus increases stability of the overall average itself and helps create a more robust measure.

However, in the case of dialog systems, listening to full interaction recordings in order to evaluate the user experience is a labor intensive and time consuming process. For some of the systems, the duration of the interactions can be quite high, in the tens of minutes. Moreover, based on the complexity of the dialog systems, one would need to analyze a significant number of records that statistically represent the most frequent of interactions. This statistically significant number of interactions can easily be in the hundreds for the most complex systems. Thus, multiple listening sessions for a large number of interactions would make the evaluation of the user experience quite expensive and impractical.

Disclosed is a process for increasing the robustness of the average score, thereby limiting its subjective variability as well as reducing the quantity of interaction recording listening by analysts required to perform the estimation at a reasonable level.

The variability in the scores can be reduced in accord with the following process:
  Selecting a number of different evaluators such as listeners (e.g., at least 2) for at least a subset of interactions in an evaluation corpus, where the subset of interactions are overlapped among multiple listeners. That is to say, a subset of the same calls can be evaluated amongst the multiple listeners. As shown in FIG. 1 and below, the process is robust because greater than 80% of the evaluated interactions are within a predetermined score difference (e.g., one or less).
  Accept a score of the interactions that do not show any scoring difference across different listeners;
  Assign an average score to all the interactions that have an absolute predetermined score difference among the listeners, for instance not more than 1 point. The average score is computed as the arithmetic average among all scores assigned by each listener;
  Perform an adjudication process for all the interactions that have a score difference among the listeners that is larger than the predetermined score difference, for instance more than 1 point. The adjudication process includes:
    Having the listeners reevaluate each interaction;
    Having listeners resubmit their judgment after the reevaluation; and
    Repeating the reevaluation and resubmission until the difference in scores for each interaction until the difference is null or small (i.e., within the predetermined score difference.)

Disclosed is an automated method for the estimation a set of statistically significant interaction recordings. Also disclosed is an algorithm that can be implemented to automatically provide the subjective CE rating from objective measures. Automated methods can be based on any of a number of known machine learning algorithms (for instance a decision tree) trained on a set of training samples. Exemplary machine learning software implementing such algorithms includes MALLET, a Java-based package for statistical natural language processing, document classification, clustering, topic modeling, information extraction, and other machine learning applications to text. (McCallum, Andrew Kachites. "MALLET: A Machine Learning for Language Toolkit." http://mallet.cs.umass.edu. 2002). Each training sample would be formed by one or more subjective ratings given by a listener in conjunction with a set of features derived by performing objective measurements on the interactions, for instance number of speech recognition errors or no-matches, number of times speech was not heard, duration of the prompts, etc. As is understood by ordinarily skilled artisans, the number and kind of such features for spoken dialog systems and IVR systems can be quite large, for instance, numbering in the thousands. The function to learn is the association among the features and the value of the user experience estimated by human listeners for an interaction. If the training material is statistically representative and the chosen features are relevant to the evaluation of the user experience, existing machine learning algorithms can learn a function that is able to predict the user experience on a new set of sample interactions.

Figure 2:
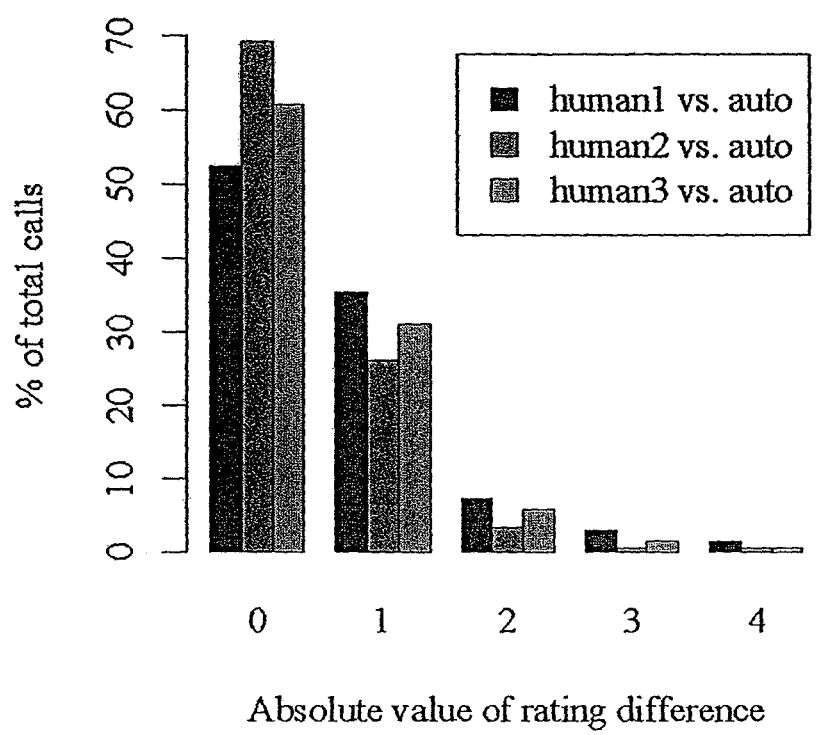
FIG. 2 is a histogram of the number of each degree of difference in CE ratings for three human-to-automated rater comparisons.

FIG. 2 shows a histogram reporting on the distribution of the agreement between automatic and human user experience scores for each individual interaction recording. As explained below, comparing this distribution with the error across different listeners (as in FIG. 1) shows that automatic prediction of the caller experience is able to produce results with similar error variability and, hence, with a similar robustness. For example, as with in FIG. 1, greater than 80% of the evaluated interactions by the automated rater are also within a predetermined score difference (e.g., one or less).

Using data from 1500 calls annotated by 15 expert listeners, an algorithm can be implemented to automatically provide the subjective CE rating from objective measures.

1. Design

Fifteen-hundred (1500) calls were selected to be listened to from an IVR based telephony system. The dialog system is a top-level call router with over 250 distinct call categories. See David Suendermann, Phillip Hunter, and Roberto Pieraccini, "Call classification with hundreds of classes and hundred thousands of training utterances . . . and no target domain data," in *Proceedings of the PIT*, Kloster Irsee, Germany, 2008, incorporated by reference herein. A set of 15 expert raters listened to approximately 100 calls each, and provided a CE rating for each call. Calls in which the caller did not interact with the automated system (e.g., by providing no speech input) were excluded from the CE rating. In total, 1390 calls with a valid CE rating were selected for analysis. Of these, 1188 calls (85%) were randomly selected and set aside as the training set for the automated rater (see Section 2.2). The remaining 202 calls (15%) were selected for repeat listening by expert human listeners. This smaller set was then used to compare both how well the human listeners perform when compared with each other and how well the automated rater performs when compared to human listeners.

1.1. Human Listeners

In order to be able to compare the consistency between different individual human listeners, each of the 202 calls in the test set was listened to two additional times, for a total of three listenings per call. This number was settled on as a compromise between breadth (total number of distinct calls listened to) and depth (number of repeat listeners per call). For each repeated listening of any given call, a new human listener was selected randomly from the initial set of 15 listeners. When listening to a call for a second or third time, the listeners were not aware of what CE rating was given to the call by the previous listener(s), so that they would not be influenced by the prior ratings. Thus, each of the 202 calls was listened to by three distinct listeners; these three sets of listening tasks will be referred to as human 1, human2, and human3 below.

1.2. Automated Rater

The automated rater was created by constructing a classifier from the set of 1188 training calls, using the CE values from 1-5 provided by the human listeners as the target classes. For each call the feature vector used for training consisted of objective measures that can be automatically extracted from the speech logs that are generated routinely for all calls to the system. Four of these measures, which were considered to be informative in determining the CE, were used for training the automated rater: the classification status of the call (how well the system determined the reason for the call), the number of speech recognition errors during the call, the number of operator requests from the caller, and the exit status of the call (whether the caller's task was completed, or where the caller was subsequently transferred).

Any classifier can be used as a machine learning algorithm. A decision tree was chosen for the classifier. An exemplary description of decision trees may be found in J. Ross Quinlan, C4.5: Programs for machine learning, Morgan Kaufmann, 1992, the entirety of which is incorporated by reference herein. As will be understood by ordinarily skilled artisans, when trying to predict a score for a caller experience, the process can be understood as a classification task, e.g., choosing one out of the set of five choices [1, 2, 3, 4, 5]. The process can also be understood as an estimation task, as for instance where the algorithm returns a real value (such as 2.315890457554818). Accordingly machine learning algorithm can be selected from any number of classifiers. Exemplary classifiers and exemplary descriptions are given below, the entirety of each description being incorporated by reference herein:

- Decision tree: (e.g.: J48 (Ross Quinlan (1993). C4.5: Programs for Machine Learning. Morgan Kaufmann Publishers, San Mateo, Calif.);
- Decision tree (REPTree (Witten, I. H., & Frank, E. (2005). Data mining: Practical machine learning tools and techniques (2nd ed.) San Francisco: Morgan Kaufmann);
- Propositional rule learner: (e.g.: Repeated Incremental Pruning to Produce Error Reduction (RIPPER), JRip (William W. Cohen: Fast Effective Rule Induction (1995) In Proceedings of the Twelfth International Conference on Machine Learning)); and
- Linear Regression (Edwards, A. L. An Introduction to Linear Regression and Correlation. San Francisco, Calif.: W. H. Freeman, 1976).

The classifier was constructed from the training set by iterating over all possible splits of values (y) for all possible features (f) to determine which split produced the highest information gain (IG). IG is defined as the difference in entropy (H) between the distribution (D) before the split and the weighted sum of the entropies of the nodes after the split (for a split that has K possible outcomes) as shown in equation 1. The decision tree was implemented with a 25% confidence threshold for pruning, and the resulting model contained 31 leaves.

Equation 1

$$IG(f, y) = H(D) - \sum_{k=1}^{K} \frac{|D_k|}{|D|} \times H(D_k) \quad (1)$$

For each of the 202 test calls, the automated rater chose the most likely class (CE rating) by following the nodes of the decision tree model corresponding to the feature values for that call. The set of CE ratings predicted by the automatic rater are referred to as auto below.

2. Results

2.1. Agreement Metric

After the three rounds of call listening were conducted on the test set, the ratings from the three sets of human listeners were compared with each other as well as with the predictions made by the automatic rater. In order to determine how well the different sets of listeners agreed in their subjective evaluation of CE for each call, inter-rater agreement was measured using Cohen's κ. Jacob Cohen, "A coefficient of agreement for nominal scales," Educational and Psychological Measurement, vol. 20, no. 1, pp 37-46, 1960, incorporated by reference herein. Cohen's κ takes into account the amount of agreement expected due to chance based on the distribution of the classes. Cohen's κ is defined in equation 2, where P(a) is the relative observed agreement between two raters, and P(e) is their hypothetical agreement due to chance.

Equation 2

$$\kappa = \frac{P(a) - P(e)}{1 - P(e)} \quad (2)$$

The simplest κ measurement treats all instances of disagreement between raters identically. However, in a task such as CE rating, where the classes represent a ranked continuum—such that a rating of 5 is closer to a rating of 4 than any other rating, a rating of 2 is closer to 1 or 3 than 4, etc.—κ can be calculated by taking into account these inherent distances between the classes. For the comparison, a linearly weighted κ was used, in which each disagreement between two raters is assigned a weight, w, using the formula in equation 3, where d represents the numerical difference between the classes, and k represents the number of classes.

Equation 3

$$w = 1 - \frac{d}{k-1} \quad (3)$$

With 5 levels of CE (and, thus, a maximum numerical difference of 4 between ratings), an exact agreement between two raters receives a weight of 1, a difference of 1 point receives a weight of 0.75, etc.

2.2. Human-to-Human Agreement

Table 1 presents the κ value for comparisons between the three sets of human listeners on the test set. All three κ values are quite close, meaning that the level of agreement among the three sets of listeners is consistent. Furthermore, the κ values are relatively high, indicating that different expert human listeners were able to provide similar subjective CE ratings to the same calls.

TABLE 1

Comparison of agreement among human raters

| Tasks Compared | κ |
| --- | --- |
| human1 vs. human2 | 0.77 |
| human1 vs. human3 | 0.78 |
| human2 vs. human3 | 0.80 |

FIG. 1 shows an analysis of the CE rating task, which is a comparison of agreement among human raters. It presents the frequencies of different levels of CE rating differences for each human-to-human comparison. The percentages of calls in which the two human listeners agreed completely (i.e., provided the exact same CE rating) are 54.0%, 56.9%, and 59.4% for the three human-to-human comparisons. Similarly, the combined percentages of calls in which the two human listeners differed by at most one CE point were 88.7%, 87.6%, and 91.6%, respectively.

2.3. Human-to-Automatic Rater Agreement

The CE predictions from the automatic rater for each call were compared to the CE ratings provided by the three sets of human listeners. The κ values for these three comparisons are provided in Table 2. The CE predictions from the automatic rater for each call were compared to the CE ratings provided by the three sets of human listeners. The κ values for these three comparisons are provided in Table 2.

TABLE 2

Comparison of agreement between human raters and automatic rater

| Tasks Compared | K |
| --- | --- |
| human1 vs. auto | 0.75 |
| Human2 vs. auto | 0.85 |
| Human3 vs. auto | 0.80 |

A comparison of the results in Table 2 with the human-to-human results in Table 1 shows that the automatic rater agrees with human listeners to about the same degree as the humans agree with each other: the average κ for the three human-to-automated rater comparisons, 0.80, is similar to the average κ for the three human-to-human comparisons, 0.78.

FIG. 2 shows the number of each degree of difference in CE ratings for the three human-to-automated rater comparisons. Again, a high percentage in each set achieved a rating that was either identical or within one point: 88.1%, 95.5%, and 92.1%, respectively.

Comparisons between the results in Tables 1 and 2, on the one hand, and FIGS. 1 and 2, on the other, show that the automatic rating system is able to provide CE ratings as consistently as humans: the average κ values and the average classification performance of the automatic rater vs. the human listeners are similar to the average values obtained by comparing the different sets of human listeners. However, there is a larger range of variation among the three human-to-automatic rater comparisons than among the human-to-human comparisons. For example, when compared with the second set of listeners (human2) the automatic rater showed the highest K and had by far the largest number of exact matches 69.3% vs. 60.9% and 52.5%. However, the fact that the average values for the three comparisons using the automated system are substantially the same as the three human-to-human comparisons indicates that the variation would level out with a larger set of training data and demonstrates that the automatic rating process successfully emulates human behavior.

An examination of the decision tree model produced by the training process gives some insight into the criteria being used by the human raters when providing their subjective CE ratings. The first feature that the model splits on is the number of utterances within a call that are not recognized correctly by the system, and the value that it splits on is 1 (i.e., whether the entire call had 0 misrecognitions vs. 1 or more misrecognitions). The other three features used as input to train the automated predictor (the call's classification status, its exit status, and the number of operator requests) were all selected as nodes in the pruned decision tree, meaning that they did provide useful information in predicting the CE for some calls.

Figure 3:
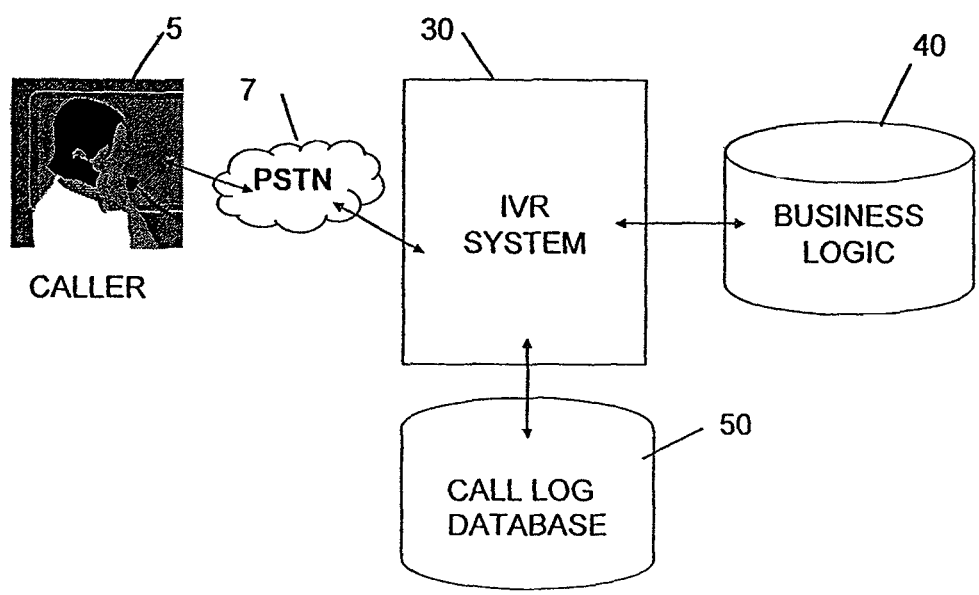
FIG. 3 shows the architecture of a system on which the present invention may be implemented.

FIG. 3 shows the architecture of a spoken dialog system on which the present invention may be implemented. As shown in FIG. 3, a caller 5 connects, via the public telephone network (PSTN) 7, or any other voice network (e.g. local network, or VoIP), to an IVR system 30. The IVR system is controlled by business logic 40, which determines, upon the interpretation of the caller's speech, which prompt to play or which other action to perform (for instance, the IVR can be connected to another system, not shown in the figure, and request additional services or information in order to appropriately address the problem). Typically the business logic is implemented through a call-flow, which includes the actions (e.g. voice prompts, database lookup, etc. ... ) to execute in response to a caller's voice request or answer. For each turn of the interaction, the IVR consults the business logic in order to plan and execute the next action.

The IVR is also connected to a call log database 50 which includes relevant information about calls handled in a pre-defined period of time (e.g. hours, days, or months). This information is generally used for monitoring and billing for the IVR usage. Among other types of information, the call log database may include a categorization of each call based on the degree of success of the call in resolving a specific caller's customer care issue. For example, the IVR hosting company may charge a fee to the enterprise for the customer care service provided for each successfully completed call, as reported in the call log database. The information in the call log database may also or alternatively be used for assessing the overall quality and effectiveness of the IVR, improving it, or monitoring unpredicted changes in the environment (e.g. outages in the services provided).

Figure 4:
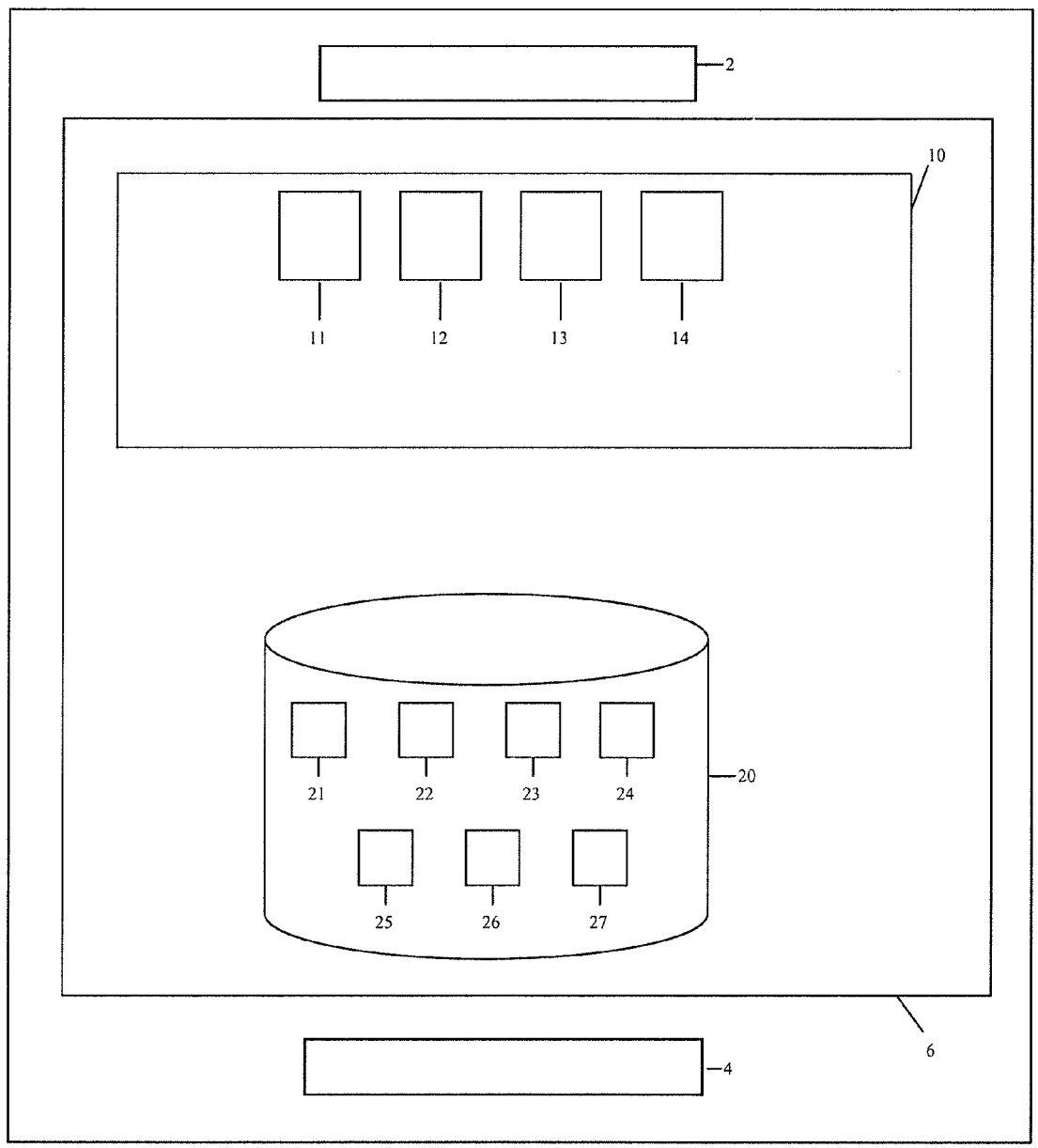
FIG. 4 shows a system overview for a system according to an embodiment of the invention.

FIG. 4 shows another embodiment of a system overview a spoken dialog system. As disclosed therein a spoken dialog system 1, comprises a computer including a signal input/output, such as via a network interface 2, for receiving input such as an audio input, a processor 4, and memory 6, including program memory 10. The system 1 may be implemented on a general-purpose computer under the control of a software program. Alternatively, the system 1 can be implemented on a network of general-purpose computers and including separate system components, each under the control of a separate software program, or on a system of interconnected parallel processors. Although complex, it is believed that suitable software for performing the various functions described herein can be designed and constructed by computer programmers of ordinary skill.

Figure 5:
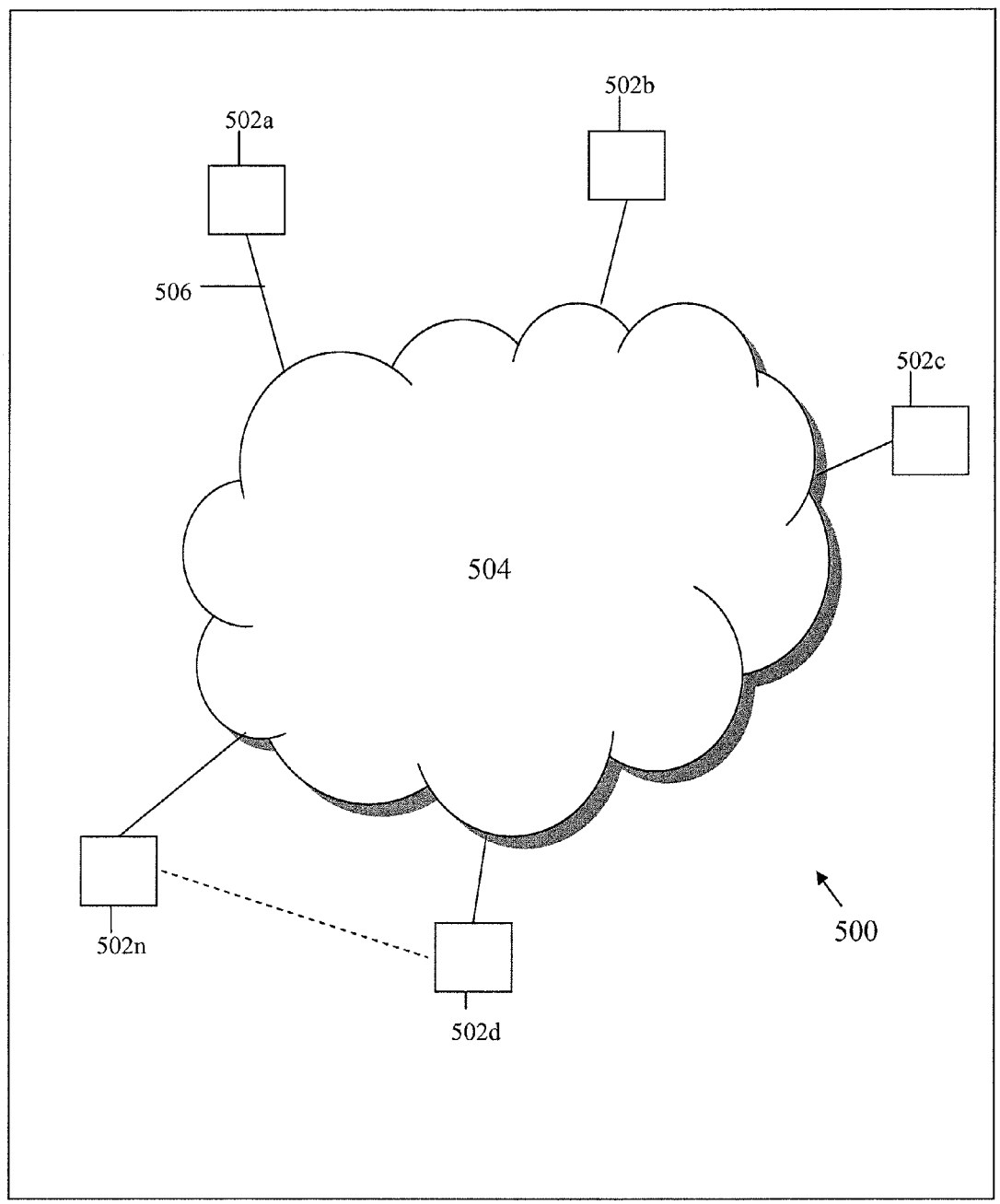
FIG. 5 shows an exemplary network environment adapted to support the present invention.

FIG. 5 shows a network environment 500 adapted to support the present invention. The exemplary environment 500 includes a network 504, and a plurality of computers, or computer systems 502 (a) ... (n) (where "n" is any suitable number). Computers could include, for example one or more SQL servers. Computers 502 can also include wired and wireless systems. Data storage, processing, data transfer, and program operation can occur by the inter-operation of the components of network environment 500. For example, a component including a program in server 502(a) can be adapted and arranged to respond to data stored in server 502(b) and data input from server 502(c). This response may occur as a result of preprogrammed instructions and can occur without intervention of an operator.

The network 504 is, for example, any combination of linked computers, or processing devices, adapted to access, transfer and/or process data. The network 504 may be private Internet Protocol (IP) networks, as well as public IP networks, such as the Internet that can utilize World Wide Web (www) browsing functionality, or a combination of private networks and public networks.

A computer 502(*a*) for the system can be adapted to access data, transmit data to, and receive data from, other computers 502 (*b*) . . . (*n*), via the network or network 504. The computers 502 typically utilize a network service provider, such as an Internet Service Provider (ISP) or Application Service Provider (ASP) (ISP and ASP are not shown) to access resources of the network 504.

The computers 502 may be operatively connected to a network, via bi-directional communication channel, or interconnector, 506, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 504 may be used to feed, or provide data.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

For example, a computer hosting a speech recognition engine may communicate to a computer hosting a classifier program via local area networks, wide area networks, direct electronic or optical cable connections, dial-up telephone connections, or a shared network connection including the Internet using wire and wireless based systems.

Returning to FIG. 4, the system 1 includes a speech recognition engine (i.e. a speech recognizer) 12. The system also includes data storage memory 20 including a number of data stores 21, 22, 23, 24, 25, 26, 27 which can be hosted in the same computer or hosted in a distributed network architecture. Grammars are held in a grammar data store (not shown). The system 1 includes a data store for a plurality of utterances 22 received via the audio input. The system 1 further includes a classifier component including a classifier data store 23 comprising a set of semantic classifiers (i.e., an initial set of classifiers), as well as a semantic classifier program 14 for, when executed by the processor, mapping the set of utterances processed by the speech recognizer 12 to the set of semantic classifiers.

The system includes a data store for storing transcribed utterances 24 and a data store for storing annotated utterances 25. Such data can be stored, for example, on one or more SQL servers (e.g., a server for the annotation data and a server for the transcription data). The system also discloses a component which includes a program for deriving data 18. The program 18 derives data from the annotated utterances 25. The system also includes a data store 26 for storing feature data.

The system can also include a logging component including logging program 11 for, when executed by a processor, logging and storing data associated with the collected set of utterances. A logging data store 21 can store instances of speech recognition events identified by the speech recognition device at the semantic classifiers together with logging data for the semantic classifiers. Instances of utterance recognition events at these classifiers can be stored together with logging data including the name and version of the classifier(s) active, the semantic class resulting in the highest classification score of the current utterance, the state in which the utterance was recognized, the speech recognizer's hypothesis of the respective utterance, acoustic and semantic confidence scores of the respective utterance, the speech data itself, the spoken dialog system's version and additional information about the system, the caller, and the utterance.

The logging data store 21 can include data reporting the association between a state of the dialog system when the utterances were recorded and the utterances. Also, the speech recognizer hypothesis, and acoustic and semantic confidence scores, the n·m best semantic classes of the n best speech recognizer hypotheses and their respective n acoustic confidence scores and n·m semantic confidence scores can be stored. Thus logging data can include data such as the classification status of a call, the number of speech recognition errors during a call, the number of operator requests from a caller, and the exit status of the call.

The logging data store 21 also includes relevant information about calls handled in a predefined period of time (e.g. hours, days, or months). This information is generally used for monitoring and billing for the IVR usage. Among other types of information, the call log database may include a categorization of each call based on the degree of success of the call in resolving a specific caller's customer care issue. For example, the IVR hosting company may charge a fee to the enterprise for the customer care service provided for each successfully completed call, as reported in the call log database. The information in the call log database may also or alternatively be used for assessing the overall quality and effectiveness of the IVR, improving it, or monitoring unpredicted changes in the environment (e.g. outages in the services provided).

The logging data also includes recordings of each entire call (i.e., a full duplex recording). It is these recordings and subsets thereof that are subject to rating, by either an automated rater 15 or a human evaluator.

The system 1 includes an automated rater 15. The rater 15 can include a program or algorithm for, when executed by the processor, automatically providing the subjective CE rating from objective measures. The automated rater rates the interactions stored in the logging data store 21. As automated methods can be based on any of a number of known machine learning algorithms, including classifiers such as the classifiers described herein (e.g., decision tree, propositional rule learner, linear regression, etc.).

Also, a human evaluator can access or receive recorded interactions and rate calls in accord with the processes described herein. A human evaluator can be connected to the system 1 via an interface 1 that allows them to listen to the stored interactions and rate them. Listeners can evaluate the recorded interactions via any number of methods or applications known to ordinarily skilled artisans, such as via an operative connection and software and or hardware to listen to and score the recording. Other methods can also be used, such as text recordings of the stored interactions on an excel spreadsheet which are scored thereon. An evaluator can also be connected via a website which allows the listener to view and/or hear the stored calls and rate them. As will be understood by ordinarily skilled artisans, the systems, methods, details of construction or designs for accessing or receiving and scoring recorded interactions are numerous.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An interactive spoken dialog system, comprising:
a computer including a processor, and non-transitory memory, including:
a data store for storing recordings of interactions on the spoken dialog system;
a data store for feature data defining a number of features, wherein the features include a set of features selected from the group of:
the classification status of a call,
the number of speech recognition errors during a call,
the number of operator requests from a caller, and
the exit status of the call; and
an automated rater including a machine-learning algorithm configured to automatically estimate a user experience score for any set of interactions on the spoken dialog system.

2. The system of claim 1 wherein system further comprises a data store for storing logging data, wherein the logging data includes a speech log of a spoken dialog system, whereby the feature data is extracted from said logging data.

3. The system of claim 1 wherein the automated rater automatically estimates the user experience score for any set of interactions on the interactive spoken dialog system for the same features.

4. The system of claim 1 wherein the system is configured to use the rater's automated estimate in conjunction with a human evaluator estimates to score the set of interaction recordings to obtain an overall user experience score.

5. The system of claim 1 wherein the machine learning algorithm includes a classifier.

6. The system of claim 5 wherein the classifier includes a classifier selected from the group of:
a decision tree;
a propositional rule learner; and
linear regression.

7. The system of claim 4, wherein the system configured to obtain human evaluator estimates in the manner comprising:
selecting a set of the recorded interactions for the spoken dialog system;
selecting a number of the evaluators to analyze the set;
having each evaluator score the recordings;
accepting a score of the interactions that do not show any scoring difference across different evaluators;
assigning an average score to the interactions that have an absolute predetermined score difference among the evaluators;
performing an adjudication process for all the interactions that have a score difference among the evaluators that is larger than the predetermined score difference to obtain an reevaluated score; and
averaging the assigned average score and the reevaluated score to obtain an estimated value of the user experience.

8. The system of claim 7 wherein the system configured to obtain human evaluator estimates in the manner further comprising:
having the evaluators reevaluate each interaction;
having evaluators resubmit a reevaluated score; and
repeating the reevaluation and resubmission until the difference in scores for each interaction is no greater than the predetermined score difference.

9. A method to estimate a user experience score for an interactive spoken dialog system, comprising:
selecting a number of evaluators to score a number of interactions in an interactive spoken dialog system;
having each evaluator individually score the interaction recordings to evaluate the user experience of the interactive spoken dialog system; and
obtaining a value that reduces the variability in the individual scoring;
wherein the interactive spoken dialog system comprises a computer including a processor, and non-transitory memory, including:
a data store for storing recordings of interactions on the spoken dialog system;
a data store for feature data defining a number of features, wherein the features include a set of features selected from the group of:
the classification status of a call,
the number of speech recognition errors during a call,
the number of operator requests from a caller, and
the exit status of the call; and
an automated rater including a machine-learning algorithm configured to automatically estimate a user experience score for any set of interactions on the spoken dialog system, wherein the system is configured to use the rater's automated estimate in conjunction with a human evaluator estimates to score the set of interaction recordings to obtain an overall user experience score.

10. A method to evaluate user experience in a spoken dialog system comprising:
selecting a set of recorded interactions for an interactive spoken dialog system, whereby the set represents a corpus of interactions handled by the spoken dialog interaction system;
selecting a number of evaluators to analyze the set;
having each evaluator score the recordings;
accepting a score of the interactions that do not show any scoring difference across different evaluators;
assigning an average score to the interactions that have an absolute predetermined score difference among the evaluators;
performing an adjudication process for all the interactions that have a score difference among the evaluators that is larger than the predetermined score difference to obtain an reevaluated score; and
averaging the assigned average score and the reevaluated score to obtain an estimated value of the user experience,
wherein the interactive spoken dialog system comprises a computer including a processor, and non-transitory memory, including:
a data store for storing recordings of interactions on the spoken dialog system; and
an automated rater including a machine-learning algorithm configured to automatically estimate a user experience score for any set of interactions on the spoken dialog system.

11. The method of claim 10 wherein the adjudication process comprises:
having the evaluators reevaluate each interaction;
having evaluators resubmit a reevaluated score; and repeating the reevaluation and resubmission until the difference in scores for each interaction is no greater than the predetermined score difference.

12. The method of claim 11 wherein the evaluators reevaluate each interaction after communication amongst the evaluators about the evaluators' initial scoring.

13. The method of claim 10 wherein the predetermined score difference is 1 point.

14. The method of claim 10 wherein assigning the average score is computed as the arithmetic average among all scores assigned by each evaluators.

15. A method to automatically estimate the quality of the user experience for a spoken dialog system comprising wherein the interactive spoken dialog system comprises a computer including a processor, and non-transitory memory, including a data store for storing recordings of interactions on the spoken dialog system; and an automated rater including a machine-learning algorithm configured to automatically estimate a user experience score for any set of interactions on the spoken dialog system, the method comprising:

creating a pool of sample training interactions for the spoken dialog system;

defining a number of features for each interaction in the pool of sample training interactions, wherein the features can be derived and measured from information associated with each interaction;

associating the features of each training interaction with a value of a user experience score produced by a plurality of evaluators;

training a machine learning algorithm using features and the scores of each interaction, wherein the algorithm is trained to predict the score for the features; and using the trained machine-learning algorithm to automatically estimate the user experience score for any set of interactions on an interactive voice response system;

obtaining human evaluator estimates by the method comprising selecting a set of recorded interactions for an interactive spoken dialog system, whereby the set represents a corpus of interactions handled by the spoken dialog interaction system, selecting a number of evaluators to analyze the set, having each evaluator score the recordings, accepting a score of the interactions that do not show any scoring difference across different evaluators, accepting an average score to the interactions that have an absolute predetermined score difference among the evaluators, performing an adjudication process for all the interactions the have a score difference among the evaluators that is larger than the predetermined score difference to obtain an reevaluated score, and averaging the assigned average score and the reevaluated score to obtain an estimated value of the user experience; and using the automated estimate in conjunction with the human evaluator estimates to score a set of interaction recordings to obtain an overall user experience score.

16. The method of claim 15 wherein the machine learning algorithm includes a classifier.

17. The method of claim 16 wherein the machine learning algorithm is selected from the group of:

a decision tree;

a propositional rule learner; and linear regression.

18. The method of claim 15 wherein the features include measures extracted from a speech log of a spoken dialog system.

19. The method of claim 15 wherein the features include a set of features selected from the group of:

the classification status of a call, the number of speech recognition errors during a call, the number of operator requests from a caller, and the exit status of the call.

20. The method of claim 15 wherein the method includes:

automatically estimating the user experience score for any set of interactions on a different spoken dialog system, or automatically estimating the user experience score for any set of interactions on the same spoken dialog system.

21. The method of claim 15 wherein the adjudication process comprises:

having the evaluators reevaluate each interaction;

having evaluators resubmit a reevaluated score; and repeating the reevaluation and resubmission until the difference in scores for each interaction is no greater than the predetermined score difference.

* * * * *

UNITED STATES PATENT AND TRADEMARK OFFICE
CERTIFICATE OF CORRECTION

PATENT NO. : 8,520,808 B2
APPLICATION NO. : 12/575801
DATED : August 27, 2013
INVENTOR(S) : Dayanidhi et al.

Page 1 of 1

It is certified that error appears in the above-identified patent and that said Letters Patent is hereby corrected as shown below:

In the Claims

In claim 7, column 15, line 65, please change "an" to --a--.

In claim 15, column 18, line 1, please change "accepting" to --assigning--.

Signed and Sealed this
Fifteenth Day of October, 2013

Teresa Stanek Rea
*Deputy Director of the United States Patent and Trademark Office*